June 8, 1965 G. F. PRITCHARD ETAL 3,187,712

LIFESAVING DEVICE

Filed Sept. 30, 1963

INVENTORS
Glenn F. Pritchard.
Bernice A. Pritchard.

United States Patent Office 3,187,712
Patented June 8, 1965

---

3,187,712
LIFESAVING DEVICE
Glenn F. Pritchard and Bernice A. Pritchard, both of 12627 155th St. SE., Renton, Wash.
Filed Sept. 30, 1963, Ser. No. 312,549
2 Claims. (Cl. 116—124)

This novel invention relates to devices used in the art of saving the lives of people who are lost or otherwise unintentionally separated from civilization in normally remote parts of the world and, more particularly, to a device that indicates to rescuers where lost people may be found.

With the advent of the airplane man has more and more begun to investigate distant parts of the earth, parts that are sometimes hundreds of miles from civilization, parts of the earth that are heavily wooded, or covered by deep canyons and high mountains where if one were lost one could hardly be seen from the air without some mechanical or related means of assistance.

It is, therefore, the principal object of this invention to provide a lifesaving device that will permit one's location to be seen from a distance by reason of a fluorescent balloon as will be hereinafter described.

Another object of this invention is to provide a lifesaving device that is so light in weight and compact that it can be carried on one's back for release of its fluorescent balloon if one becomes lost.

Another object of this invention is to provide a lifesaving device that will indicate the location of a person by means of a released fluorescent balloon no matter how high the trees may be in the area.

Another object of this invention is to provide a lifesaving device that can be adapted to any aircraft or vehicle which may, through unforeseen circumstances, become lost as well as incapacitated and, therefore, in need of outside assistance.

Another object of this invention is to provide a lifesaving device that can also be used in liferafts of oceangoing ships or aircraft for instant spotting by search crews should the craft become inoperative and thus in need of help.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
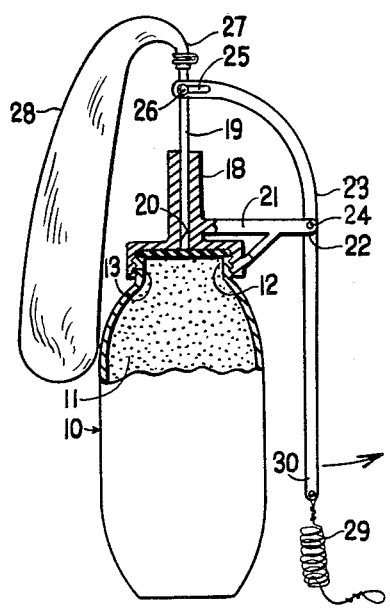
FIGURE 1 is a side view of this invention ready for use with its gas-filled cartridge partly broken open in order to show its internal construction.
Figure 2:
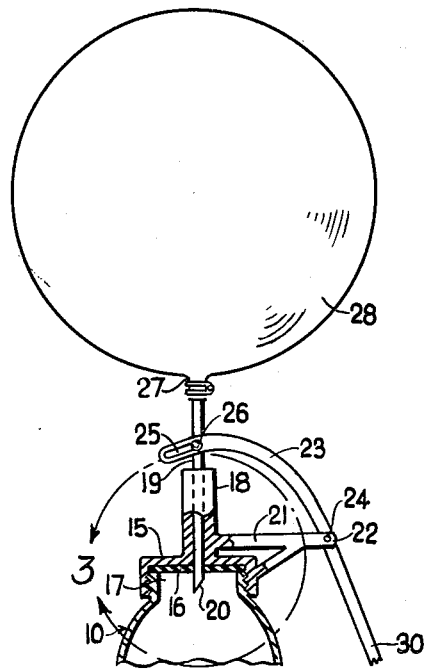
FIGURE 2 is a side view of the upper end of the gas-filled cartridge and the fluorescent balloon after the latter has been filled. The upper end of the gas-filled cartridge is shown in cross-section.
Figure 3:
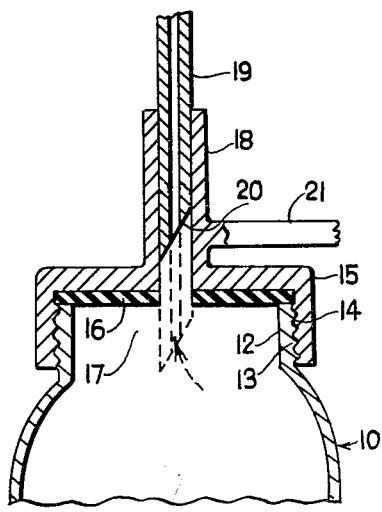
FIGURE 3 is an enlarged view of that portion of FIGURE 2 that is shown within the arrowed circle and indicated by the Numeral 3.
Figure 4:
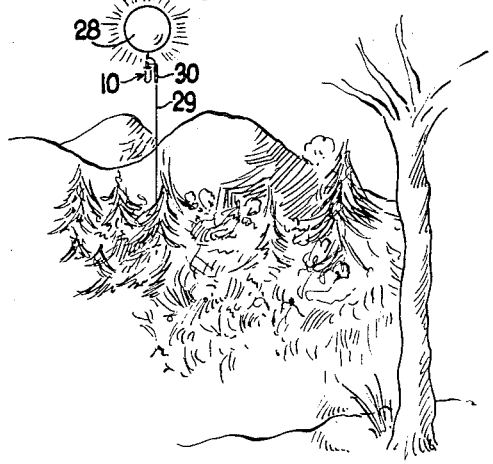
FIGURE 4 is a pictorial view of this invention in actual use.

Referring now specifically to the drawing, the Numeral 10 generally designates a cartridge filled with a lighter-than-air gas 11. The upper end 12 of the aforesaid cartridge 10 is provided with external threads 13 that are normally in engagement with the internal threads 14 of the cap 15, which is screwed on top of cartridge 10 after the same has been filled with the already mentioned gas and the rubber closure 16 placed over the opening of the neck 17 of the cartridge.

The aforesaid cap 15 is provided with a centrally located vertical hollow needle guide 18 in which is slidably located the hollow needle 19 that has its lower end 20 formed at an angle in order to better pierce the aforesaid rubber gasket 16. A trigger support arm 21 is preferably integral with the aforesaid hollow needle guide 18 from which it extends horizontally outward to terminate in a rounded end 22 to which is pivotally secured the trigger 23 by means of a rivet 24 or its equivalent. The upper end of the aforesaid trigger is curved and flattened out in order to provide room for the elongated opening 25 through which passes a pin 26 that projects outward from the aforesaid hollow needle 19 that has the neck 27 of the fluorescent balloon 28 secured thereto. The fluorescent balloon 28 is of such cubic gas capacity as to permit the same to not only rise up into the air but also to have enough lifting power to carry the cartridge 10 and its connecting mechanism up in the air at a height that will be determined by the length of the cord 29 that is secured to the lower end 30 of the aforesaid trigger 23. The lower end of the cord 29 is, of course, connected to either the hiker or the aircraft in which he is riding. In the present instant a cord of one hundred feet is recommended although this can be either longer or shorter according to the desires of the user of this lifesaving device.

All that is necessary for one to do when he becomes lost or desirous of attracting attention to his whereabouts is to pull the lower end 30 of the trigger 23 outward in the direction indicated by the curved arrow in FIGURE 1 of the drawing and the upper end of the trigger will press the hollow needle 19 downward until its lower end 20 pieces the rubber gasket 16 by means of the aforesaid pin 26 projecting outward from one side of the aforesaid hollow needle 19. The second the rubber gasket 16 is pierced, the lighter-than-air gas 11 in the cartridge 10 will immediately flow up through the hollow needle 19 into the fluorescent balloon 28 through its neck 27. When all the gas has flowed into the balloon 28 the same will naturally rise upward taking the invention with it as has already been stated. Once a person has been rescued the invention can be recovered and a new rubber gasket 16 secured in place after the fluorescent balloon has been deflated and the cartridge recharged with the lighter-than-air gas 11.

The foregoing is considered as illustrative only of the principles of this invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A life saving device of the character described, comprising a cartridge having lighter-than-air gas therein, the upper end of said cartridge terminating in a neck having external threads thereon, a frangible closure on top of said neck, a cap having internal threads that are screwed down over the said neck of the said cartridge after said cartridge has been filled with the said gas and the closure put in place, the said cap having a centrally located vertical hollow needle guide the opening of the guide extending through the cap, a hollow needle slidably mounted in said hollow needle guide, said needle having its lower end sharpened in order that the said hollow needle will pierce the said closure, a horizontal trigger support arm extending outward from the said hollow needle guide with which it is integral, a balloon secured to the upper end of the said hollow needle and trigger means secured to said trigger support and needle for moving the needle to pierce the closure and allow the gas to pass through the needle and inflate the balloon.

2. A lifesaving device of the character described, comprising a cartridge having lighter-than-air gas therein, the upper end of the said cartridge terminating in a neck having external threads thereon, a rubber closure on top of said neck, a cap having internal threads that are screwed down onto the said neck of the said cartridge after the said cartridge has been filled with the lighter-than-air gas, the said cap having a centrally located vertical hollow needle guide, the opening of the needle guide extending through said cap, a hollow needle slidably mounted in said hollow needle guide, said needle having its lower end sharpened in order that the said hollow needle will pierce the said rubber closure, a horizontal trigger support arm extending outward from the lower end of the said hollow needle guide with which it is integral, a trigger pivotally secured intermediate of its ends to said horizontal trigger support, a connection between one end of the trigger and said hollow needle, and a fluorescent balloon secured to the upper end of the said hollow needle thereby permitting the lighter-than-air gas to flow upward from the said cartridge through the said hollow needle into the said fluorescent balloon to cause the balloon to float upward to a predetermined height, carrying the said cartridge with it and a cord having one end secured to the cartridge, cap, assembly and the other end securable to any suitable restraining means.

References Cited by the Examiner

UNITED STATES PATENTS

| | | | |
|---|---|---|---|
| 2,395,006 | 2/46 | Leslie | 116—124.9 |
| 2,619,303 | 11/52 | Martin | 116—124.9 |
| 2,646,019 | 7/54 | Chetlon | 116—124.9 |
| 2,842,090 | 7/58 | Samwald | 116—124.9 |
| 2,878,774 | 3/59 | Carroll | 116—124.9 X |
| 2,882,853 | 4/59 | Reeves | 116—124.9 X |
| 2,923,917 | 2/60 | McPherson et al. | 116—124.9 |
| 2,924,192 | 2/60 | Salvage | 116—124.9 X |
| 3,002,490 | 10/61 | Murray | 116—124.9 |

LOUIS J. CAPOZI, *Primary Examiner.*